(12) United States Patent
Freudling

(10) Patent No.: US 8,672,793 B2
(45) Date of Patent: Mar. 18, 2014

(54) DRIVE DEVICE FOR MOTOR VEHICLES

(75) Inventor: Ulrich Freudling, Ingolstadt (DE)

(73) Assignee: Audi AG, Ingolstadt (DE)

( * ) Notice: Subject to any disclaimer, the term of this patent is extended or adjusted under 35 U.S.C. 154(b) by 723 days.

(21) Appl. No.: 12/247,578

(22) Filed: Oct. 8, 2008

(65) Prior Publication Data

US 2009/0098973 A1      Apr. 16, 2009

(30) Foreign Application Priority Data

Oct. 10, 2007   (DE) .................. 10 2007 048 649

(51) Int. Cl.
*B60K 17/16*     (2006.01)
*F16H 48/20*     (2012.01)

(52) U.S. Cl.
USPC ............ 475/210; 475/243; 475/199

(58) Field of Classification Search
USPC ........... 475/225, 221, 198, 199, 201, 89, 252, 475/251, 220, 226, 227, 228, 231, 236, 237, 475/212, 210, 213, 6, 248, 243
See application file for complete search history.

(56) References Cited

U.S. PATENT DOCUMENTS

| | | | |
|---|---|---|---|
| 3,376,760 A * | 4/1968 | Gordanier | 475/25 |
| 4,907,672 A * | 3/1990 | Muzzarelli | 180/233 |
| 5,055,094 A * | 10/1991 | Cataldo | 475/211 |
| 5,071,395 A * | 12/1991 | Fahy et al. | 475/226 |
| 5,080,210 A * | 1/1992 | Hagiwara | 192/48.3 |
| 5,112,284 A * | 5/1992 | Dye | 475/228 |
| 5,188,574 A * | 2/1993 | Echigo et al. | 475/206 |
| 5,232,415 A * | 8/1993 | Brewer et al. | 475/227 |
| 5,445,580 A * | 8/1995 | Parraga Garcia | 477/211 |
| 5,547,430 A * | 8/1996 | Gasch | 475/89 |
| 5,643,131 A * | 7/1997 | Kuhn et al. | 475/210 |
| 5,846,152 A * | 12/1998 | Taniguchi et al. | 475/210 |
| 6,071,207 A * | 6/2000 | Stephens et al. | 475/204 |
| 6,293,888 B1 * | 9/2001 | Moon | 475/210 |
| 7,086,982 B2 * | 8/2006 | Bowen | 475/225 |
| 7,354,373 B2 * | 4/2008 | Abiru et al. | 475/201 |

(Continued)

FOREIGN PATENT DOCUMENTS

| | | |
|---|---|---|
| DE | 39256487 A1 | 4/1990 |
| DE | 199 02 637 A1 | 7/2000 |

(Continued)

*Primary Examiner* — David D Le
*Assistant Examiner* — Lillian Nguyen
(74) *Attorney, Agent, or Firm* — Novak Druce Connolly Bove + Quigg LLP

(57) ABSTRACT

The invention relates to a drive device for motor vehicles with at least one longitudinal output or transverse output differential gear, with an input shaft, and with a means for controlled torque distribution to the two output shafts. A quick-response, structurally advantageous drive device is thus achieved in that the differential gear is a self-locking differential gear and in that a speed-regulation drive, which changes the differential-side speed of 1:1 in the plus or minus direction based on dynamic performance parameters, is integrated into one of the output shafts, or in that speed-regulation drives, which alternately change the differential-side speed of 1:1 in the plus direction or in the negative direction based on dynamic performance parameters, are integrated into two output shafts.

6 Claims, 2 Drawing Sheets

(56) References Cited

U.S. PATENT DOCUMENTS

| | | | |
|---|---|---|---|
| 7,677,996 B2* | 3/2010 | Fleischmann | 474/28 |
| 7,806,219 B2* | 10/2010 | Oberhausen et al. | 180/245 |
| 2003/0125153 A1* | 7/2003 | Kukucka et al. | 475/198 |
| 2006/0289217 A1* | 12/2006 | Schlaf et al. | 180/247 |
| 2007/0144283 A1* | 6/2007 | Hasegawa et al. | 74/325 |
| 2007/0155577 A1* | 7/2007 | Nett et al. | 475/221 |
| 2008/0194372 A1* | 8/2008 | Glockler | 475/210 |
| 2008/0207363 A1* | 8/2008 | Maguire | 474/8 |

FOREIGN PATENT DOCUMENTS

| | | |
|---|---|---|
| DE | 19902637 A1 | 7/2000 |
| DE | 202004016571 U1 | 12/2004 |
| DE | 20 2004 016571 U1 | 1/2005 |
| DE | 102005004291 A1 | 8/2006 |
| DE | 112008000404 T5 | 1/2010 |
| JP | 62297559 A | 12/1987 |
| WO | 2008103543 A1 | 8/2008 |

* cited by examiner

DRIVE DEVICE FOR MOTOR VEHICLES

CROSS-REFERENCE TO RELATED APPLICATIONS

This application claims priority from German Patent Application No. 10 2007 048 649.0 filed Oct. 10, 2007.

The invention relates to a drive device for motor vehicles.

BACKGROUND OF THE INVENTION

Such drive devices with means for variable drive torque distribution, e.g., on the front axle and the rear axle of the motor vehicle or on the right and the left driven wheel of an axle of the motor vehicle, are known from, e.g., DE 10 2005 010 751 A1 or DE 103 316 B4. In this case, additional planetary gears with variable transmission or a preliminary gear shaft that connects the two output shafts via gear drive and controllable couplings, which shift the drive torque based on dynamic performance parameters (torque vectoring), are used, with said planetary gears having a design that is relatively expensive to produce.

The object of the invention is to propose a drive device of the generic type that enables a quick-response drive torque distribution while including the differential function and with means that are simpler to produce and control.

SUMMARY OF THE INVENTION

According to the invention, it is proposed that the differential gear is a self-locking differential gear that is known in the art and that a speed-regulation drive, which changes the differential-side speed of 1:1 in the plus or minus direction based on the dynamic performance parameters, is integrated into one of the output shafts. As an alternative, speed-regulation drives, which alternately change the differential-side speed of 1:1 in the plus direction or in the negative direction based on the dynamic performance parameters, can be integrated into the two output shafts according to claim 3.

When the motor vehicle is driven under normal conditions, the function of the self-locking differential gear is conventional. The speed-regulation drive is in the 1:1 transmission and thus almost inoperable. If differences in speed occur on the output shaft due to, e.g., differences in road surface, torque is shifted conventionally via the locking action to the output shaft that has a lower speed.

If, when taking curves, a higher drive torque is to be directed to the drive wheel on the outside curve or in an intermediate axle differential on the front or rear axle, in order to support the drive system under dynamic performance conditions, a difference in speed, which converts the locking differential into its locking action and thus also correspondingly changes the drive torque, is triggered by the speed-regulation drive. The triggering of the speed-regulation drive can be controlled conventionally based on the steering angle of the motor vehicle, its speed, its yaw angle, etc.

In this case, the speed-regulation drive preferably changes the speed of the output shaft between 0.8 to 1.2, in the alternative embodiment by 1 to 1.2.

In an advantageous way, the self-locking differential can be a "torque-sensing" Torsen® differential, which is distinguished by an especially quick and sensitive response. As an alternative, the self-locking differential can also be a viscous coupling that locks the output shafts in the event of a defined difference in speed. Such locking differentials are widely known from the prior art and have been series-tested.

The speed-regulation drive can preferably be an infinitely variable continuous-belt drive, although the use of other infinitely various converters (e.g., toroidal gear, friction gear) is also conceivable.

As an alternative, the speed-regulation drive can be a switchable gear with gear stages with a 1:1 transmission and one or two speed-regulation transmissions, which can be switched, e.g., electrically or hydraulically and via sturdy friction couplings.

The differential gear can be designed as a longitudinal output intermediate axle differential in two-axle-driven motor vehicles with the speed-regulation drive being integrated preferably in the output shaft in the rear axle.

In addition or as an alternative, the differential gear can be a transverse output front-axle or rear-axle differential, in whose one or the two output shafts are arranged the speed-regulation drive or drives that are directly adjacent to the differential housing.

BRIEF DESCRIPTION OF THE DRAWINGS

Two embodiments of the invention are explained in more detail below with additional details. In the drawings.

DETAILED DESCRIPTION OF THE PREFERRED EMBODIMENTS OF THE INVENTION

Figure 1:
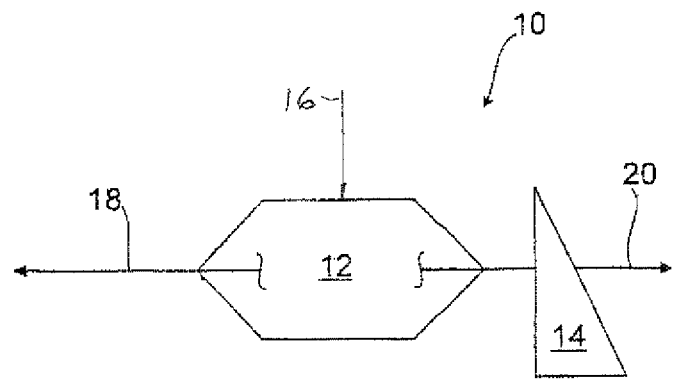
FIG. 1 as a block diagram shows a drive device for motor vehicles with a self-locking differential gear and a speed-regulation drive that is integrated into an output shaft.

In FIG. 1, a drive device 10 for motor vehicles, with a self-locking differential gear 12 and a speed-regulation drive 14, is shown as a block diagram.

The differential gear 12 has an input shaft 16, which is drive-connected conventionally to an internal combustion engine (or an electric motor) and a speed-regulation gear.

The self-locking differential gear 12 is a Torsen® differential, known in the art (cf., e.g., quattro drive of the applicant's motor vehicles), with two output shafts 18, 20 as output elements, with the speed-regulation drive 14 being integrated into the right output shaft 20 in the drawing.

The output shafts 18, 20 are usually drive-connected via cardan shafts, not shown, to the wheels (front wheels and/or back wheels) of the motor vehicle.

Figure 3:
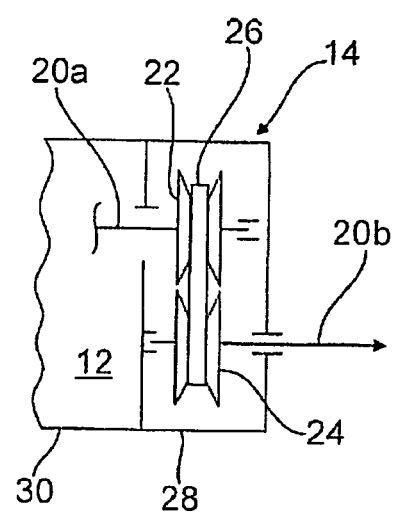

According to FIG. 3, the infinitely variable speed-regulation device 14 is a continuous-belt drive with two wedge-shaped disk pairs (22, 24) (similar to a CVT gear), which work together via a belt or a chain 26 to be driven. In each case, a disk of the disk pair 22, 24 is arranged to be able to move axially via an adjustment device, not shown, for setting the transmission ratio, as a result of which, in a way that is known in the art, the effective continuous-belt radius on the disk pairs 22, 24 can be changed.

The transmission ratio of the speed-regulation drive 14 is designed in such a way that in the neutral setting, a transmission 1:1 is present; the transmission ratio can also be varied infinitely to 0.8 (minus direction) up to 1.2 (plus direction), with the output-related outer section 20*b* of the output shaft 20 being slowed down or sped up relative to the driving section 20*a*.

The degree of axial offset of the divided output shaft 20 by the speed-regulation drive 14 is relatively slight based on the slight degree of transmission change of 0.8 to 1.2 that is needed and optionally can be compensated for by the subsequent cardan shaft (not shown). The offset can optionally be averaged distributed onto the two cardan shafts.

In addition, the speed-regulation gear 14 is attached with its housing 28 directly to the housing 30 of the differential gear 12.

In FIG. 1, the self-locking differential gear 12 is designed as a transverse output front axle differential or as a rear axle differential, whose output shafts 18, 20 are connected as described above via cardan shafts to the driving wheels of the motor vehicle.

When the motor vehicle is driven under normal conditions, the speed-regulation drive 14 is adjusted with the speed ratio 1:1 and is thus inoperable. In the event of differences in speed occurring between the output shafts 18, 20, e.g., based on uneven road surface adhesion coefficients, the Torsen® differential 12 works in a self-locking manner or increasingly directs the output torque to the slower-rotating output shaft 18 or 20; this corresponds to the common function of self-locking differential gears.

If, when taking curves, e.g., a higher drive torque is to be provided to the drive wheel on the outside curve in order to support the motor vehicle under dynamic performance conditions, e.g., the output shaft 20 is slowed down or sped up in proportion to dynamic performance conditions, such as the steering angle of the steering of the motor vehicle, speed, yaw angle, etc., by triggering the speed-regulation drive 14, in such a way that the self-locking Torsen® differential 12 responds and increasingly releases drive torque to the output shaft 18 or 20. This significantly increases, e.g., the curve agility of the motor vehicle.

Figure 2:
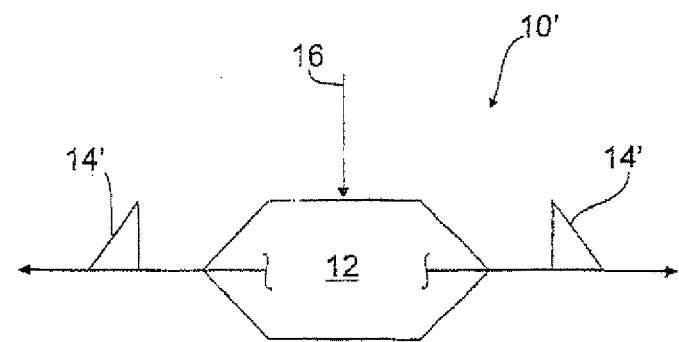
FIG. 2 also as a block diagram shows an alternative drive device with a self-locking differential and two speed-regulation drives that are integrated into the two output shafts, and FIG. 3 in a rough diagrammatic view shows a speed-regulation drive that is designed as a continuous-belt drive according to FIG. 1 or 2.

In FIG. 2, an alternative drive device 10', which is only described insofar as it is significantly different from the embodiment according to FIG. 1, is shown. Functionally identical parts are provided with the same reference numbers.

According to FIG. 2, speed-regulation drives 14', which are designed essentially corresponding to FIG. 3 as continuous-belt drives, are integrated into the two output shafts 18, 20. The transmission ratios of these continuous-belt drives can be adjusted, however, only in the same direction, i.e., in the positive or negative direction. In this embodiment, the transmission ratios can be adjusted in the plus direction between 1:1 to 1:2.

Unlike in FIG. 1, either the output shaft 18 or the output shaft 20 can thus be sped up based on dynamic performance parameters in order to increase the respective drive torque on the wheel that is driven on the outside curve. Optionally, the output shaft 18 or the output shaft 20 can also be slowed down.

Figure 1A:
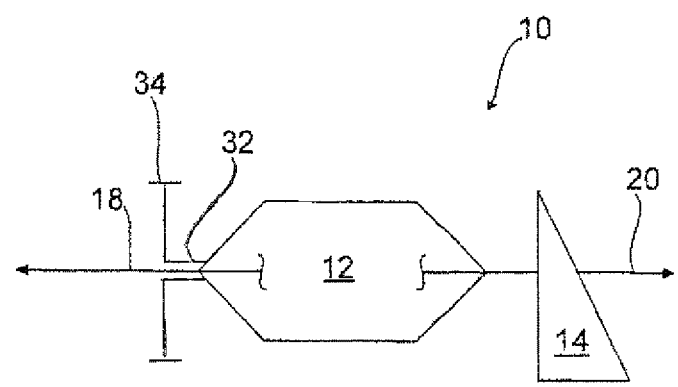
FIG. 1a as a block diagram shows a self-locking differential gear as an intermediate differential. in an all-wheel drive motor vehicle.

Referring to FIG. 1*a*, the self-locking differential gear 12 can also be designed as a longitudinal output intermediate axle differential in an all-wheel drive motor vehicle. Accordingly, the input shaft of the differential 12 is a hollow shaft 32 which is driven via a drive gear 34 of the speed-regulation gear of the motor vehicle, not shown.

Furthermore, the output shaft 18 is drive-connected in a way that is not shown to the differential gear for the front driven wheels of the motor vehicle and the output shaft 20, e.g., via a cardan shaft with the differential gear for the rear driven wheels of the motor vehicle.

According to FIG. 3, the speed-regulation drive 14, as shown in FIG. 1, is integrated into the output shaft 20. In turn, the section 20*b* of the output shaft 20 can be slowed down or sped up relative to the section 20*a* with the associated drive torque shifting to the front or the rear axle differential of the motor vehicle by a triggering of the speed-regulation drive 14 that is based on dynamic performance parameters as described above.

The invention is not limited to the described embodiments. Optionally, instead of the infinitely variable continuous-belt drive 14 or 14', a switchable gear with gear sets and friction couplings for providing a 1:1 transmission and one or two speed-regulation transmissions can also be used as described above.

As an alternative, the self-locking differential 12 can be designed with a viscous coupling in a conventional design, whose locking value of said design is matched to the set transmission ratios of the speed-regulation drive 14.

Finally, the motor vehicle can have both a longitudinal output and a transverse output self-locking differential gear 12 with speed-regulation drives 14 in the respective output shafts 18, 20, whose function is matched in proportion to dynamic performance parameters.

The invention claimed is:

1. A driveline for an all-wheel drive of a motor vehicle, comprising:
    an intermediate axle differential having a longitudinally disposed hollow input shaft drivingly connectable to the motor of said vehicle, a first output shaft extending through said hollow input shaft and a second output shaft; and
    a variable speed regulator integrated into one of said output shafts.

2. The driveline according to claim 1 wherein the speed change range of said regulator is 0.8 to 1.2.

3. The driveline according to claim 1 wherein the speed change range of said regulator is 1.0 to 1.2.

4. The driveline according to claim 1 wherein said regulator is functional to vary the speed of the associated output shaft.

5. The driveline according to claim 1 wherein said regulator comprises a variable continuous-belt drive.

6. The driveline according to claim 1 wherein said differential is a torque sensing differential.

* * * * *